(12) United States Patent
Liu

(10) Patent No.: US 8,047,479 B2
(45) Date of Patent: Nov. 1, 2011

(54) ELEVATING DEVICE WITH LATCHING FUNCTION

(75) Inventor: Lien-Ming Liu, Sinihuang (TW)

(73) Assignee: Jarllytec Co., Ltd., Taipei County (TW)

( * ) Notice: Subject to any disclaimer, the term of this patent is extended or adjusted under 35 U.S.C. 154(b) by 137 days.

(21) Appl. No.: 12/534,111

(22) Filed: Aug. 1, 2009

(65) Prior Publication Data
US 2010/0102188 A1 Apr. 29, 2010

(30) Foreign Application Priority Data
Oct. 28, 2008 (TW) .............................. 97141305 A

(51) Int. Cl.
F16M 11/00 (2006.01)
(52) U.S. Cl. ..................... 248/157; 248/295.11; 248/920
(58) Field of Classification Search ............. 248/123.11, 248/157, 195.11, 920, 95.11; 292/DIG. 4
See application file for complete search history.

(56) References Cited

U.S. PATENT DOCUMENTS

| | | | | |
|---|---|---|---|---|
| 4,657,292 A * | 4/1987 | Bruck | ............................. | 292/80 |
| 4,669,764 A * | 6/1987 | Bruck | ............................. | 292/85 |
| 6,712,321 B1 * | 3/2004 | Su et al. | .................... | 248/123.11 |
| 6,905,099 B2 * | 6/2005 | Sung | ............................. | 248/146 |
| 6,918,564 B2 * | 7/2005 | Yen et al. | ....................... | 248/404 |
| 7,036,787 B1 * | 5/2006 | Lin | ................................ | 248/676 |
| 7,180,731 B2 * | 2/2007 | Titzler et al. | ............. | 361/679.22 |
| 7,390,045 B2 * | 6/2008 | Tiesler | ........................ | 296/24.34 |
| 2004/0113031 A1 * | 6/2004 | Sung | ............................. | 248/146 |
| 2005/0184215 A1 * | 8/2005 | Lin | ................................ | 248/676 |
| 2007/0217134 A1 * | 9/2007 | Shin | .............................. | 361/681 |
| 2008/0099637 A1 * | 5/2008 | Pai | ................................ | 248/157 |

* cited by examiner

Primary Examiner — Terrell McKinnon
Assistant Examiner — Daniel J Breslin
(74) Attorney, Agent, or Firm — Guice Patents PLLC

(57) ABSTRACT

An elevating device with a latching function including a supporting rack, a supporting seat, a constant force spring and a latching member. The supporting seat moves longitudinally with respect to the supporting rack, and has a shaft rod automatically recovering towards a central line thereof. An arrow-shaped positioning block is installed in a front end of the latching member, a positioning concave slot is formed at bottom ends of a first and a second guiding planes of the positioning block. When the shaft rod moves with the supporting seat in the supporting rack, the shaft rod moves downwardly along the first guiding plane to enter the positioning concave slot forming a latching status. When the shaft rod moves downwardly in the positioning concave slot, the shaft rod is released from the positioning concave slot forming a releasing status, and the shaft rod moves upwardly along the second guiding plane.

20 Claims, 11 Drawing Sheets

ELEVATING DEVICE WITH LATCHING FUNCTION

BACKGROUND OF THE INVENTION

1. Field of the Invention

The present invention relates to an elevating device, more particularly to an elevating device with latching function.

2. Description of Related Art

For a better viewing sensation, a display device, especially a flat panel display device, is provided with not only a function of adjusting elevation angle but also a function of adjusting height, so the display device can be more user friendly and meet different needs from users with various body shapes.

Generally, an elevating device used in a display device has a pair of retaining rails and a pair of mobile rails sleeved in the pair of retaining rails, so the pair of mobile rails is able to be longitudinally moved along the pair of retaining rails for adjusting the height of the display device. For providing a positioning function to the display device, a constant force spring is installed between the two mobile rails so the constant force spring can provide an elastic force to balance the net weight of the display device, a supporting seat of the supporting device and the pair of retaining rails.

Though the constant force spring can provide a stepless positioning function to the pair of retaining rails and the pair of mobile rails, a latching mechanism is still needed to install between the two pairs of rails, a conventional structure of "Latching mechanism of elevating device", is herein adopted as examples, when the pair of mobile rails are moved relative to the pair of retaining rails, the pair of mobile rails can be latched by the latching mechanism so as to form a latching status; at this moment, if an upward external force is applied on the display device, said device is not able to be elevated. Only after the latching status is released, the external force applied on the display device is able to adjust the height of the display device through the pair of mobile rails upwardly moving along the pair of retaining rails. So the latching mechanism plays an important role for the application of the elevating device; but a conventional display device is often installed with a push-type or press-type elevation button, so the display device can be adjusted to ascend/descend through pushing or pressing the elevation button. Said operation means may not be convenient to users and the exposed button may be a negative factor to the whole appearance of the display device.

Moreover, the supporting seat provided between the mobile rails of the elevating device is connected to the display device, and the supporting seat can be latched by the latching mechanism so as to position the display device. The latching status is often utilized when packaging the elevating device for reducing the packing volume and lower the transportation cost. The latching mechanism is often served as a downward movement limitation of the supporting seat, so when a user is adjusting the height of the display device, the supporting seat is descended and is in contact with the latching mechanism for forming a latching status. So how to provide an automatic latching and releasing function to the elevating device that is in a certain status, e.g. rotating from a vertical status to a horizontal status, is needed to be developed.

SUMMARY OF THE INVENTION

One object of the present invention is to provide an elevating device with latching function; through a latching member, the elevating device is able to be ascended/descended without the need of any button, so the operation is easier and the appearance of the display device is more compact and simplified.

For achieving the mentioned object, one solution provided by the present invention is to provide an elevating device with latching function, comprises:

a supporting rack being provided with a vertical foundation sheet, the vertical foundation having two lateral ends provided with a pair of retaining rails and the top end of the foundation sheet is connected to a spring seat;

a supporting seat being provided with a seat rack, the seat rack having two lateral ends provided with a pair of mobile rails sleeved in the pair of retaining rails, and a resilient shaft rod capable of automatically recovering towards a central line thereof is protrudingly provided to the seat rack;

a constant force spring having a coil portion provided on the spring seat and a jointing portion of one free end thereof being connected to the supporting seat; and a latching member being installed at the bottom end of the foundation sheet and an arrow-shaped positioning block that is oblique with respect to the shaft rod is installed on the front end of the latching member, two planes defining the acute angle of the positioning block are respectively defined as a first guiding plane and a second guiding plane, and a positioning concave slot is formed at the bottom ends of the two guiding planes;

when the shaft rod is moved with the supporting seat in the supporting rack, the shaft rod is able to be downwardly moved along the first guiding plane to enter the positioning concave slot for forming a latching status; when the shaft rod is against downwardly moved in the positioning concave slot, the shaft rod is released from the positioning concave slot for forming a releasing status, and the shaft rod is able to be upwardly moved along the second guiding plane.

Another object of the present invention is to provide an elevating device with latching function; when the elevating device is in a certain status, e.g. rotating from a vertical status to a horizontal status, an automatic latching or releasing functions is provided for reducing the packing volume.

For achieving the object mentioned above, one solution provided by the present invention is to provide an elevating device with latching function, comprises:

a supporting rack being provided with a vertical foundation sheet, the vertical foundation sheet having two lateral ends provided with a pair of retaining rails and the top end of the foundation sheet is connected to a spring seat;

a supporting seat being provided with a seat rack, the seat rack having two lateral ends provided with a pair of mobile rails sleeved in the pair of retaining rails, and a resilient shaft rod capable of automatically recovering towards a central line thereof is protrudingly provided to the seat rack;

a constant force spring having a coil portion is provided on the spring seat and a jointing portion of one free end thereof being connected to the supporting seat;

a latching member being installed at the bottom end of the foundation sheet and an arrow-shaped positioning block that is oblique with respect to the shaft rod is installed on the front end of the latching member, two planes defining the acute angle of the positioning block are respectively defined as a first guiding plane and a second guiding plane, and a positioning concave slot is formed at the bottom ends of the two guiding planes; and a switching mechanism having a swing sheet being protrudingly provided with a stopping member and provided with a torque spring at the bottom end thereof and being pivotally connected to one bottom lateral end of the foundation sheet; so one end of the torque spring is provided against the inner end of the stopping member, the other end thereof is provided against a convex tenon protrudingly installed at the bottom end of the supporting rack, the weight of the stopping member is greater than the elastic force of the torque spring so a free end of the stopping member is transversally in contact with a retaining object;

when the supporting rack is in a vertical status, the supporting seat is downwardly moved so the shaft rod or the mobile rail is in contact with the stopping member for forming a stopping status; when the supporting rack is in a horizontal status, the weight of the stopping member is not able to be applied on the torque spring, so the torque spring is stretched to push the swing sheet to rotate, and the stopping member is moved from the retaining object with which the stopping member is in contact, so the shaft rod is moved with the supporting seat in the supporting rack and is able to be backwardly moved along the first guiding plane to enter the positioning concave slot for forming a latching status; when the shaft rod is against backwardly moved in the positioning concave slot, the shaft rod is released from the positioning concave slot for forming a releasing status, and the shaft rod is able to be forwardly moved along the second guiding plane.

DETAILED DESCRIPTION OF THE PREFERRED EMBODIMENT

As shown from FIG. 1a to FIG. 4, the elevating device provided by the present invention consists of a supporting rack 1, a supporting seat 2, a constant force spring 3 and a latching member 4.

Figure 1A:
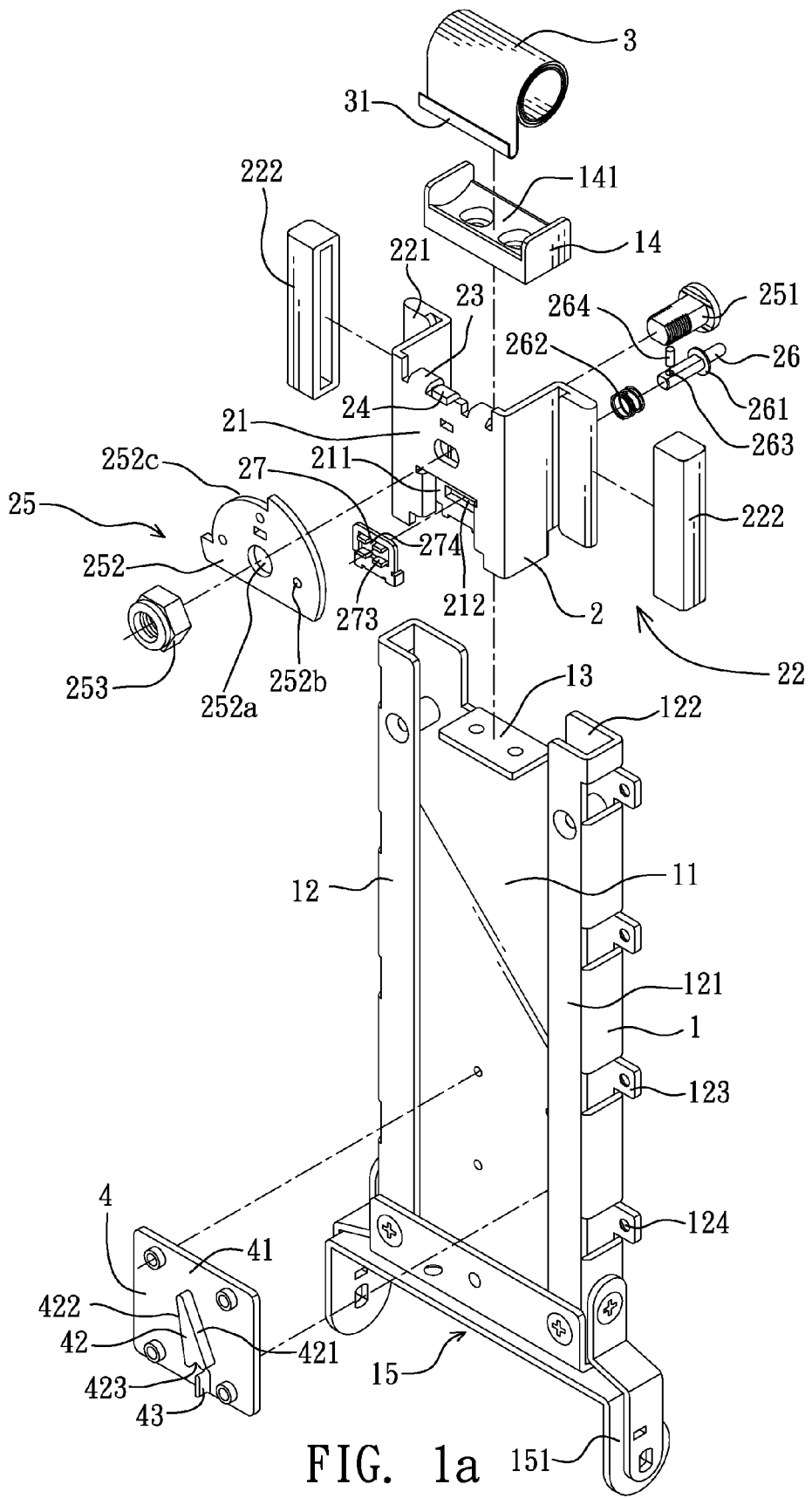
FIG. 1a is an exploded view of the elevating device of the present invention.
Figure 1B:
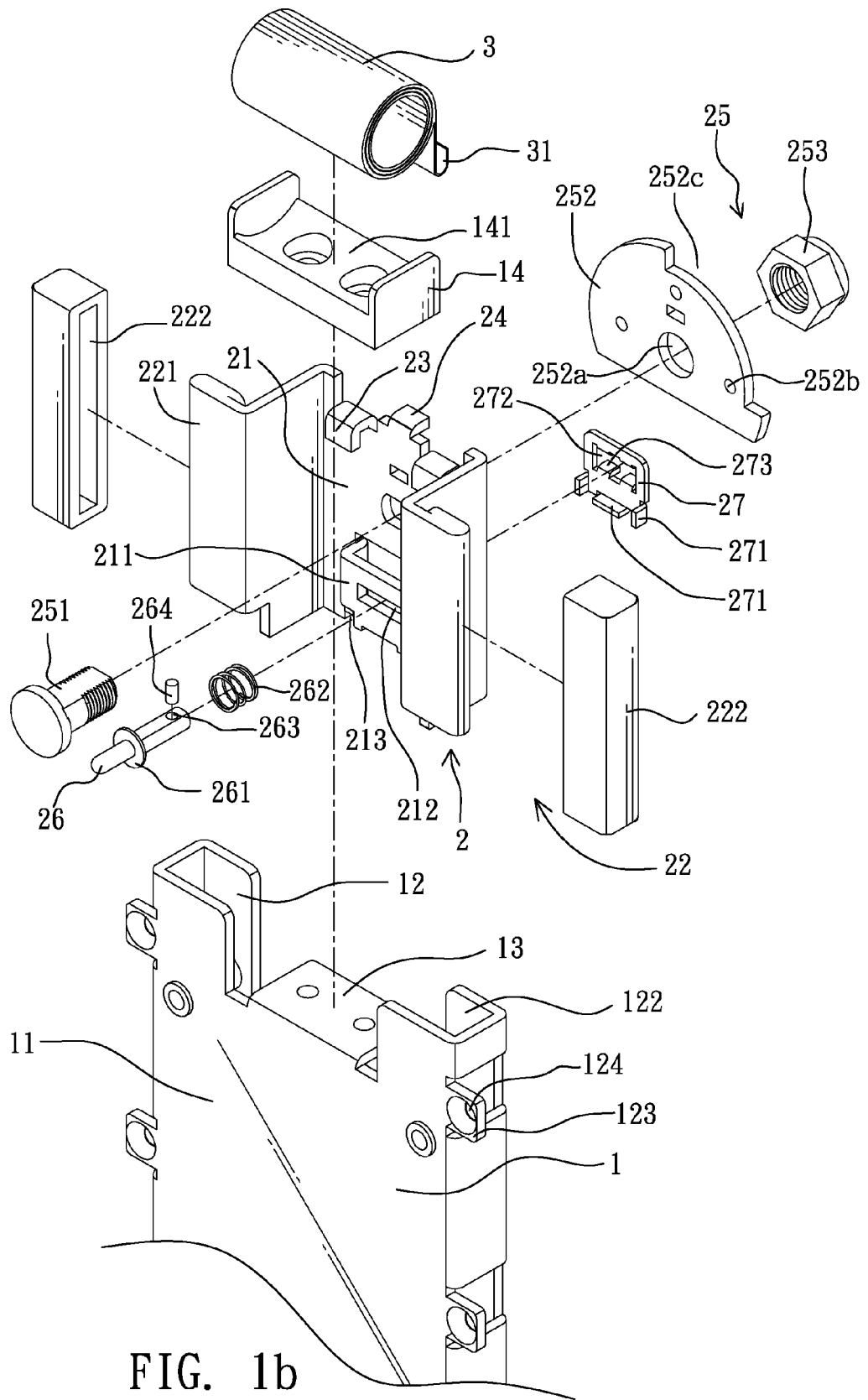
FIG. 1b is an exploded view of the supporting seat of the elevating device being viewed from another angle.

The supporting rack 1 is a vertical rack member whose bottom end is connected to a base seat (not shown), two lateral ends of a vertical foundation sheet 11 of the supporting rack 1 are installed with a pair of retaining rails 12, as shown in FIG. 1a and FIG. 1b, a pair of symmetrical L-shaped rail sheets 121 are correspondingly extended from the pair of retaining rails 12 installed at the two lateral ends of the foundation sheet 11, therefore a rail portion 122 is respectively formed between the foundation sheet 11 and each of the rail sheets 121, so two mobile rails 22 installed at two lateral ends of the supporting seat 2 can be received therein and the supporting seat 2 is able to be longitudinally moved on the supporting rack 1. A plurality of lugs 123 are provided to each of the rail sheets 121, each of the lugs 123 has a lug hole 124 for being connected to a covering member, e.g. a plastic housing, of the supporting rack 1 through a connecting unit, e.g. a screw, for enhancing the appearance of the supporting rack 1.

The top end of the foundation sheet 11 is protrudingly provided with a top board 13 so a spring seat 14 can be received thereon, the top end of the spring seat 14 has a concave arc shaped surface 141 for receiving the constant force spring 3 that is reeled into a coiled shape, so the inner wall of the constant force spring 3 touches the front wall of the spring seat 14, and a jointing portion 31 of one free end of the constant force spring 3 is buckled on the supporting seat 2. The bottom end of the supporting rack 1 has a connecting portion 15 for being directly fastened on the base seat or rack boards 151 respectively extended from two lateral ends of the connecting portion 15 can be pivotally connected to a fastening rack of the base seat, so the supporting rack 1 has functions of rotating and adjusting elevation angle with respect to the base seat.

The supporting seat 2 is served to connect to an object to be supported, e.g. a display device. A rectangular seat rack 21 is provided on the front end of the supporting seat 2 and two ends thereof are installed with the pair of mobile rails 22, as shown in FIG 1a and FIG. 1b, a pair of seat wings 221 of the mobile rails 22 are extended from two lateral ends of the seat rack 21, and an elongated sliding block 222 having a width corresponding to the rail portion 122 is respectively installed on each of the seat wings 221 so the sliding blocks 222 can longitudinally slide in the rail portions 122. For reducing the friction between the sliding block 222 and the rail portion 122, the sliding blocks 222 are preferably made of Teflon; with the low friction property of the Teflon, the friction between the rail portions 122 and the sliding blocks 222 can be reduced so a smooth operation is achieved.

In fact, not only the retaining rails 12 and the mobile rails 22 described in the embodiment but also conventional rolling-ball retaining sliding rails and mobile sliding rails can be adopted in the present invention so the supporting seat 2 can be provided with a function of longitudinally sliding with respect to the supporting rack 1.

At least one buckling hook 23 is backwardly provided to the top end of the seat rack 21 of the supporting seat 2, the buckling hook 23 is buckled with the jointing portion 31 installed on the free end of the contact force spring 3. A connecting mechanism 25 is provided at the front end of the supporting seat 2, a pivotal shaft 251 is retained thereon and after the pivotal shaft 251 passes through the seat rack 21, the pivotal shaft 251 then passes through a round shaft hole 252a of a connecting member 252 and is screw-fitted with an end sealing member 253, e.g. an anti-loosing nut. The connecting member 252 is provided with a plurality of connecting holes 252b so connecting units, e.g. screws, can pass through the connecting holes 252b and be fastened on an object to be supported, e.g. a display device, so the display device is able to be rotated relative to the supporting seat 2. For limiting the rotation angle, a stopping portion 252c is installed on the periphery of the connecting member 252, e.g. a 90-degree fan-shaped concave slot, and a stopping tenon 24 protruded from the top end of the seat rack 21 is received in the concave slot 252c. When two ends of the concave slot 252c are in contact with the stopping tenon 24, the display device is restrained from rotating, so a means of changing from a horizontal dispose to a vertical dispose or vice versa is able to achieve.

Figure 4:
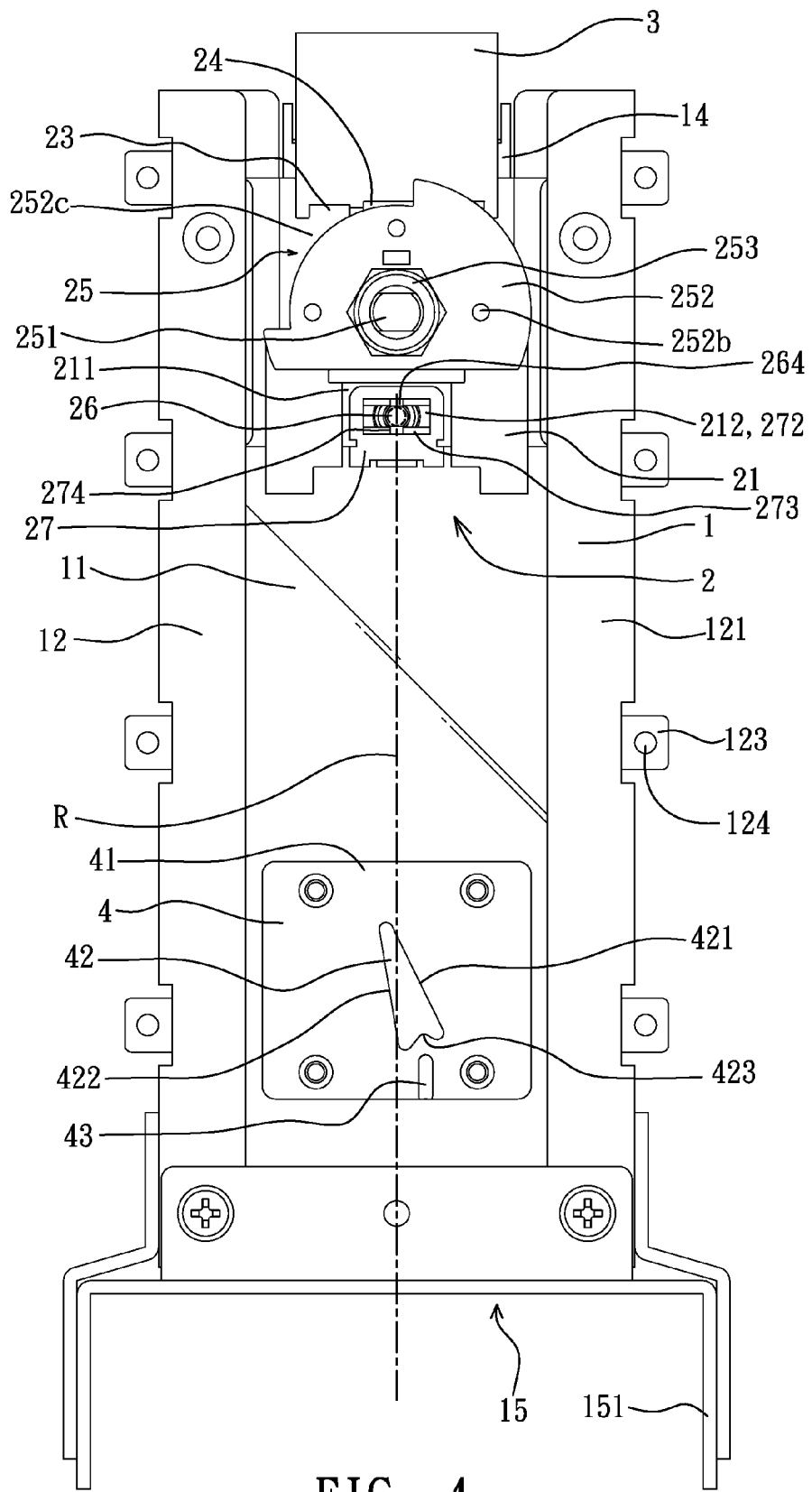
FIG. 4 is a front view of the assembly of the elevating device of the present invention.

The characteristic of the supporting seat 2 of the present invention is that a resilient shaft rod 26 capable of automatically and constantly recovering is provided to the seat rack 21, as shown in FIG. 4, the resilient shaft rod 26 is able to automatically recover with respect to a longitudinal phantom central line R and able to longitudinally move with the supporting seat 2.

As shown in FIG. 1a and FIG. 1b, for providing the automatic recovering function to the shaft rod 26, a stopping sheet 261 radially and protrudingly provided on the shaft rod 26 is radially connected to a resilient member 262, e.g. a spring, and is passed through a horizontal rod slot 212 preset on a pivotal connecting sheet 211 provided at a concave portion at the bottom end of the seat rack 21; connecting pins 271 installed on two lateral ends and a bottom end of a shaft connecting member 27 are inserted into inserting slots 213 correspondingly provided on the pivotal connecting sheet 211, so the shaft connecting member 27 is fastened in the concave portion of the seat rack 21, and a shaft connecting slot 272 transversally provided to the shaft connecting member 27 faces the rod slot 212, so the front portion of the shaft rod 26 can protrude the shaft connecting slot 272, and two parallel pairs of flanges 273 are respectively extended from the top and the bottom ends of the shaft connecting slot 272 and a pin slot 274 is formed in between, and an pin 264 is inserted in a pin hole 263 provided at the front end of the shaft rod 26 and is pivotally connected to the pin slot 274, so the shaft rod 26 is able to be swung within the seat rack 21, and with a resilient effect provided by the resilient member 262, the shaft rod 26 is able to be kept in an automatically and constantly recovering status.

In fact, the configuration of the shaft rod 26 is not limited to what is disclosed in the embodiment, for example two lateral ends of the shaft rod 26 can be respectively provided with a spring so an automatically recovering status is still provided.

The constant force spring 3 is a conventional constant force spring whose coil portion is disposed in a concave surface 141 of the spring seat 14 and the jointing portion 31 of the free end thereof is buckled on the pair of buckling hooks 23 installed on the top end of the seat rack 21. The elastic force of the constant force spring 3 is sufficient enough to support the net weight of the supporting seat 2 and the object to be supported, e.g. a display device, so the display device and the supporting seat 2 can be longitudinally elevated or positioned between the two retaining rails 12 of the supporting rack 1.

The latching member 4 is fastened on the bottom end of the foundation sheet 11 through a sheet member 41, the front end thereof is installed with an arrow-shaped positioning block 42, two planes defined the acute angle of the arrow-shaped positioning block 42 are respectively defined as a first guiding plane 421 and a second guiding plane 422, and bottom ends of the two guiding planes forms a positioning concave slot 423, so the shaft rod 26 is able to be moved along each of the guiding planes and be positioned or released from the positioning concave slot 423, an object of automatic locking or releasing is achieved. For avoiding a situation that the shaft rod 26 is released from the first guiding plane 421 and downwardly moved and the shaft rod 26 is automatically recovered towards the central line R and is directly in contact with the second guiding plane 422 therefore not able to be positioned in the positioning concave slot 423, an auxiliary guiding tenon 43 whose top end is in an arc shape is protrudingly provided below the positioning concave slot 423; when the shaft rod 26 is released from the first guiding plane 421 and is automatically recovered towards the central line R, the shaft rod 26 would be in contact with the auxiliary guiding tenon 43 and is upwardly moved along the auxiliary guiding tenon 43 then is guided into the positioning concave slot 423, so an anticipating latching function is achieved.

Figure 2:
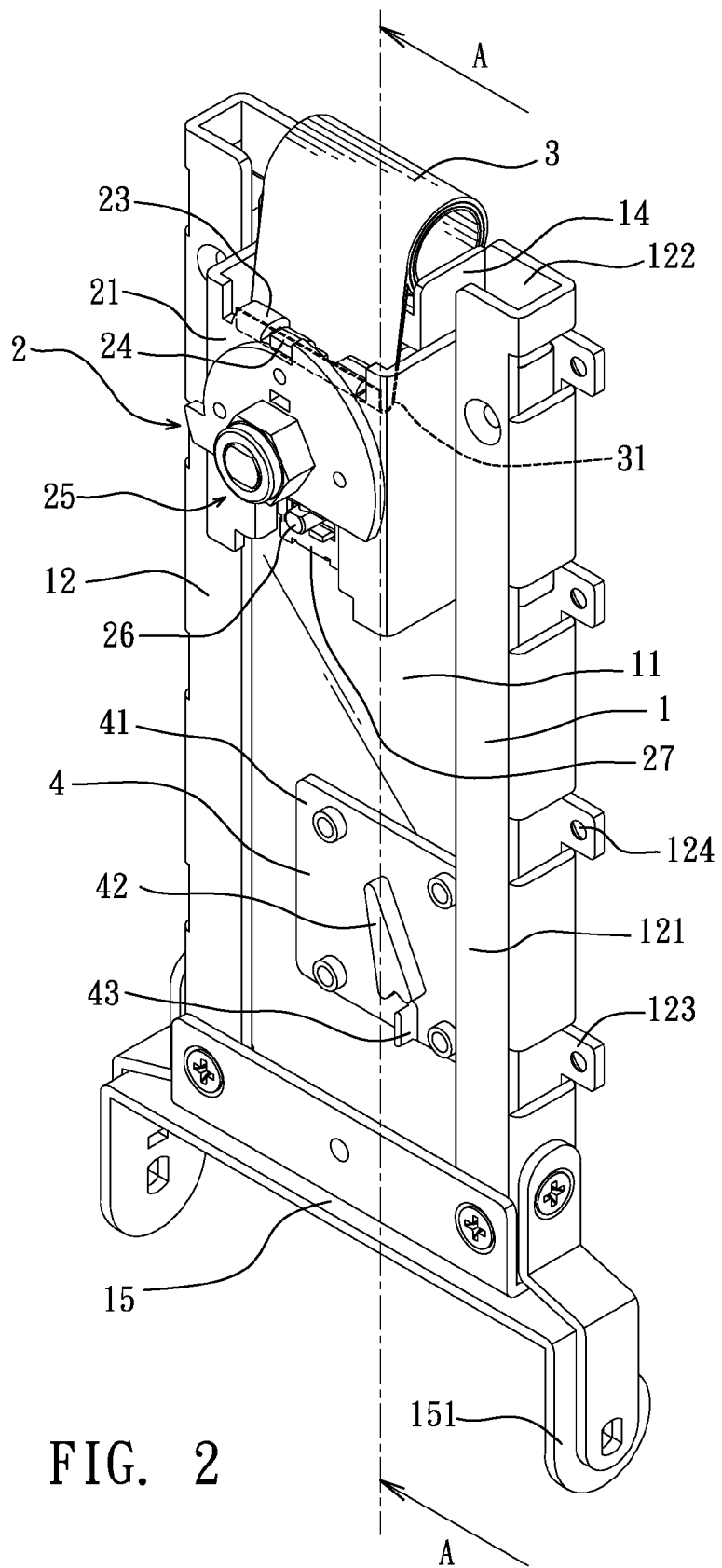
FIG. 2 is a perspective assembly view of the elevating device of the present invention.
Figure 3:
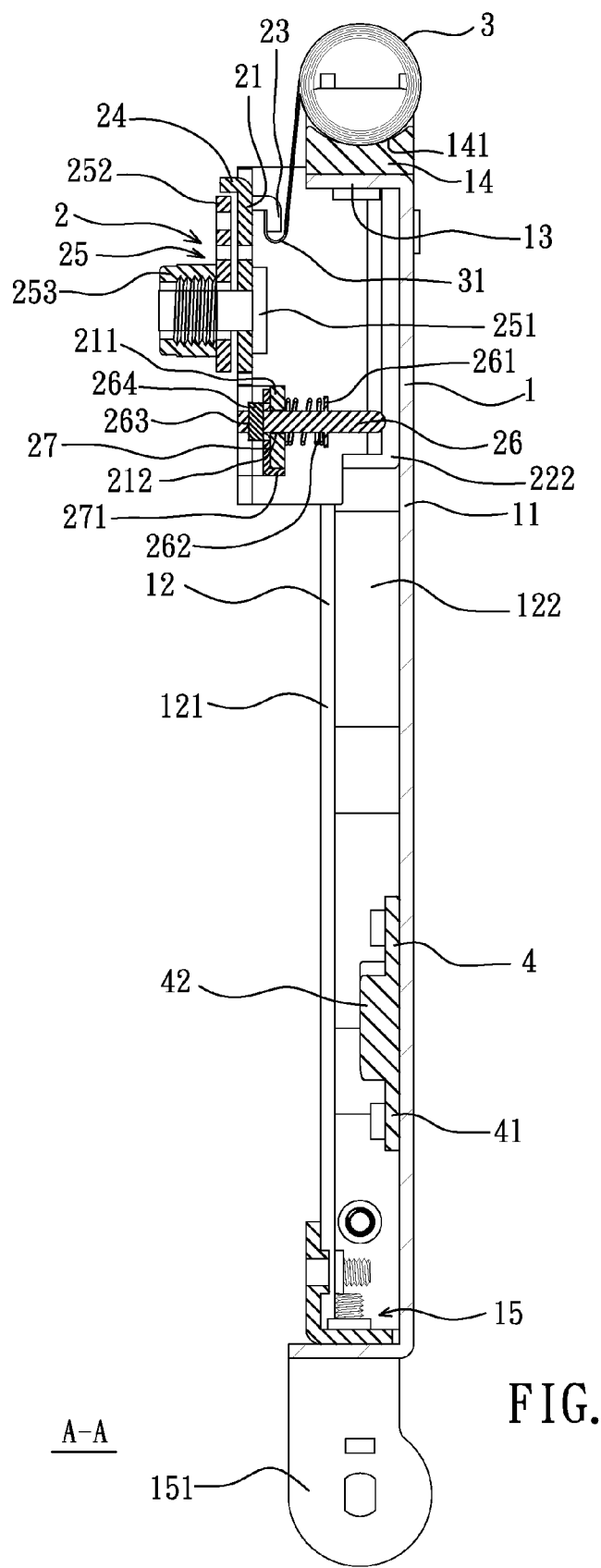
FIG. 3 is a cross sectional view of FIG. 2 intercepted along the A-A line.

FIG. 2 and FIG. 3 show the assembled elevating device with latching function provided by the present invention and the relative positions of each mentioned component; as shown in figures, the mobile rails 22 provided at the lateral ends of the supporting seat 2 are able to be longitudinally moved between the two retaining rails 12 provided at the lateral ends of the supporting rack 1. Because the jointing portion 31 of the constant force spring 3 is connected to the supporting seat 2, an upward supporting force is constantly provided to the supporting seat 2, so the downward force caused by the weight of the display device can be balanced and the supporting seat 2 is able to be smoothly moved or positioned on the supporting rack 1.

As shown in FIG. 4, which is a front view of the assembly of the elevating device provided by the present invention, the resilient shaft rod 26 capable of automatically recovering is provided at the center of the bottom end of the supporting seat 2, and the phantom central line R is extended from the shaft rod 26 to the positioning block 42 provided at the bottom end of the supporting rack 1. At this moment, the supporting seat 2 is disposed at the top end of the supporting rack 1 and the front end thereof is connected to a display device through the connecting mechanism 25. To latch the display device at the bottom end of the supporting rack 1, an external force is applied on the display device and the supporting seat 2 is driven to downwardly move together with the display device, the coil portion of the constant force spring 3 is stretched and the shaft rod 26 is downwardly moved along the central line R.

Figure 5A:
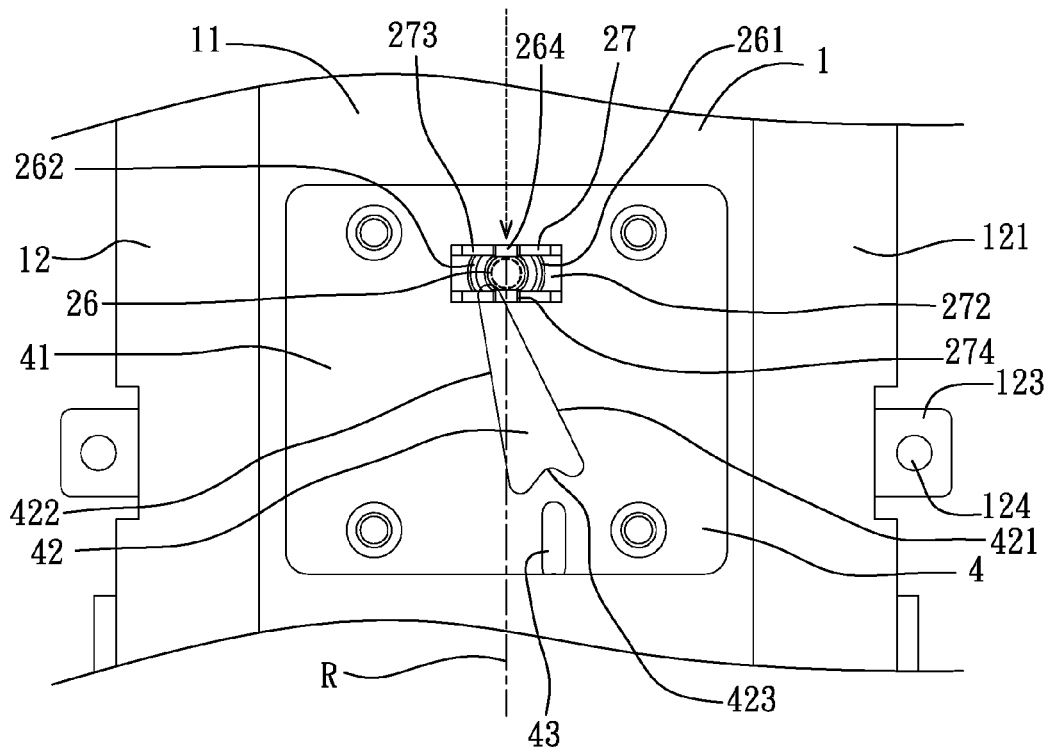
FIG. 5a to FIG. 5f are operation flowcharts illustrating latching and releasing of the supporting seat and the latching member of the present invention.
Figure 5B:
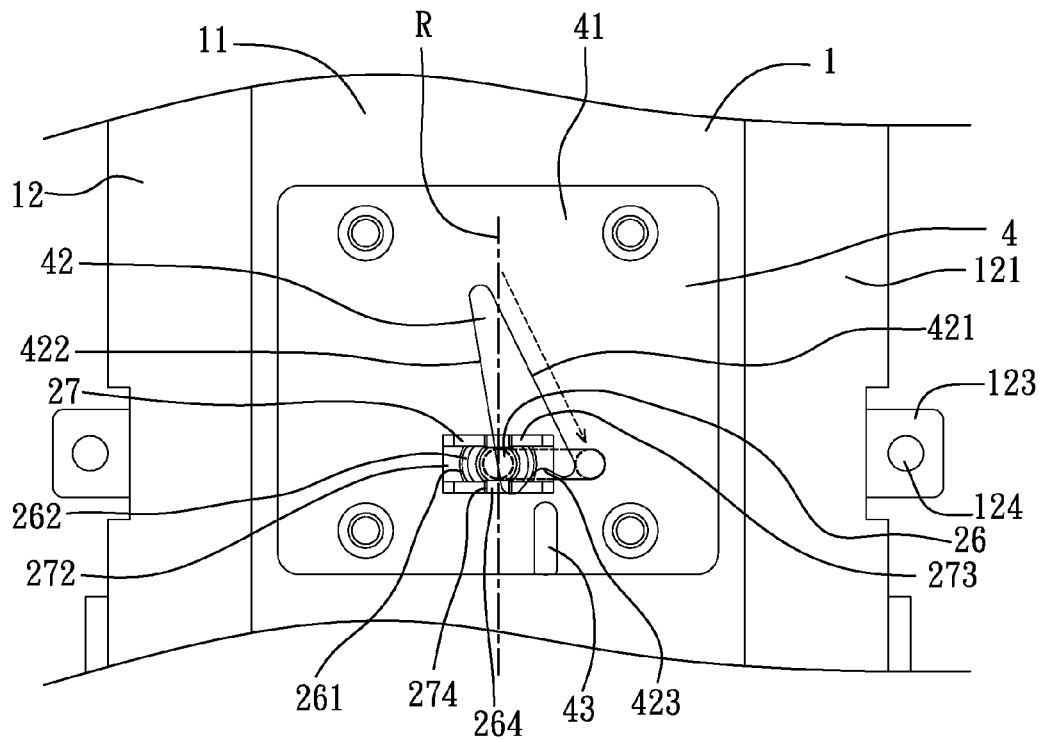
Figure 5C:
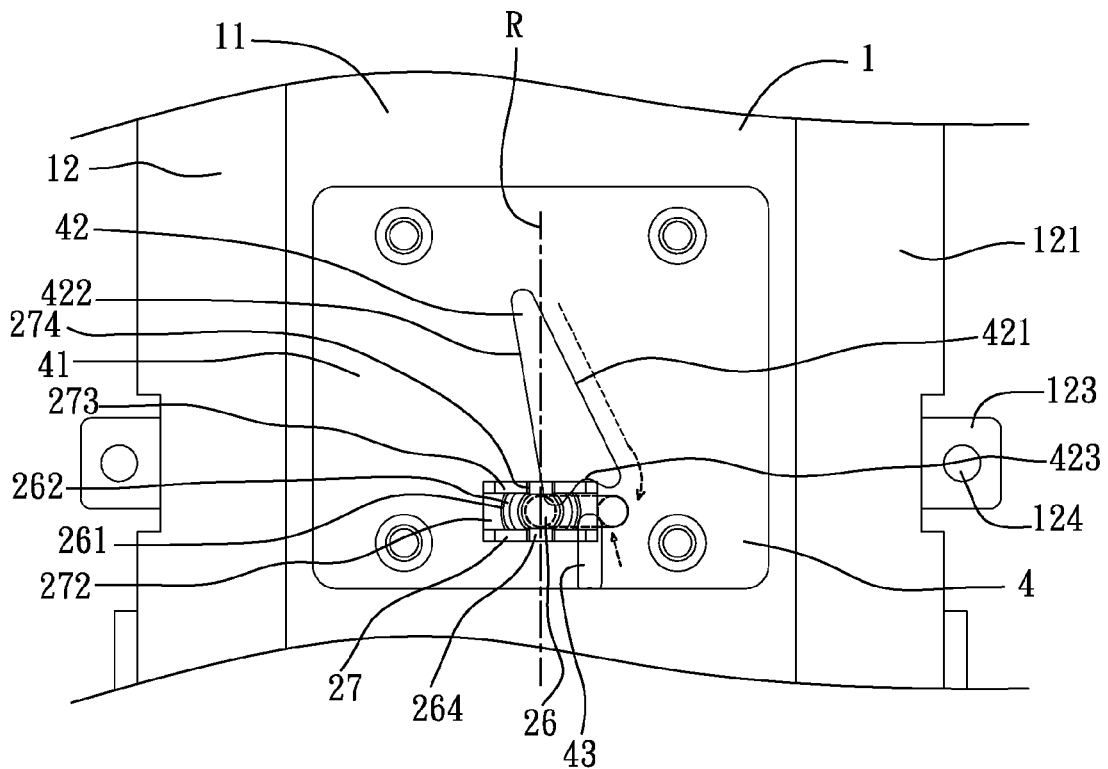
Figure 5D:
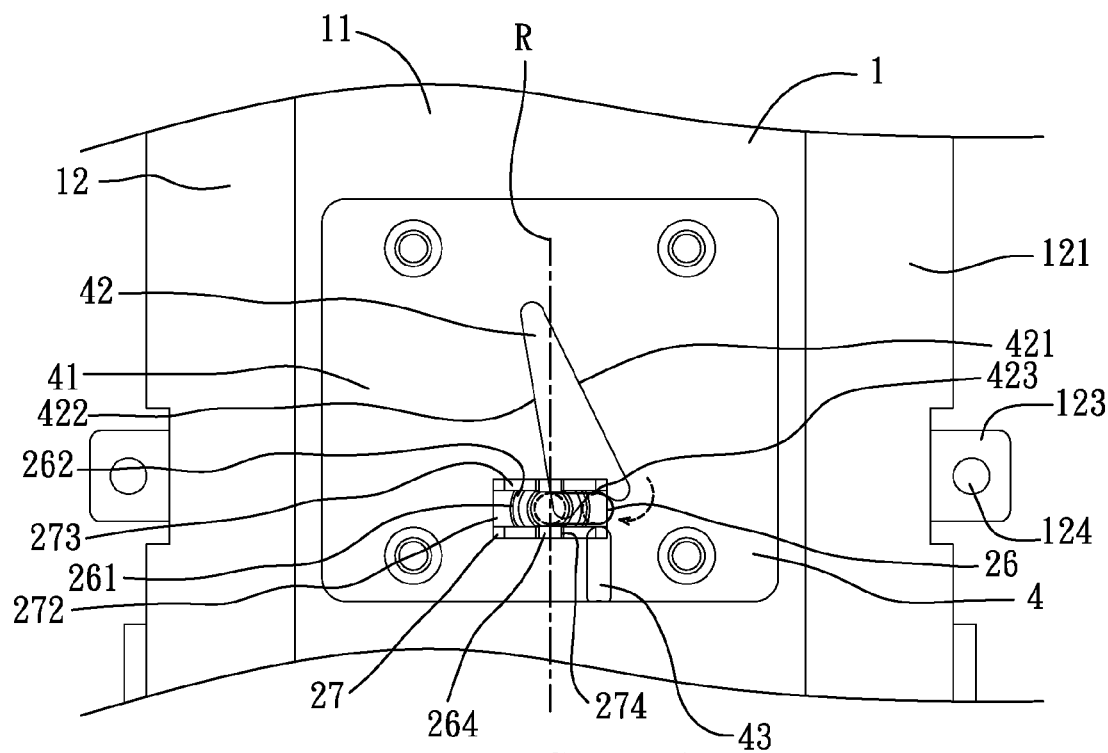

As shown in FIG. 5a, when the shaft rod 26 is downwardly moved and is in contact with the first guiding plane 421 of the positioning block 42 that is obliquely installed, the shaft rod 26 is obliquely and downwardly moved to the bottom end of the first guiding plane 421 as shown in FIG. 5b, at this moment the shaft rod 26 is no longer supported and is recovered towards the central line R, as shown in FIG. 5c, the shaft rod 26 is then in contact with the auxiliary guiding tenon 43 and is upwardly moved along the auxiliary guiding tenon 43 and is guided into the positioning concave slot 423 as shown in FIG. 5d, thus a latching status is obtained; at this moment, the display device is positioned at the bottom end of the supporting rack 1.

Figure 5E:
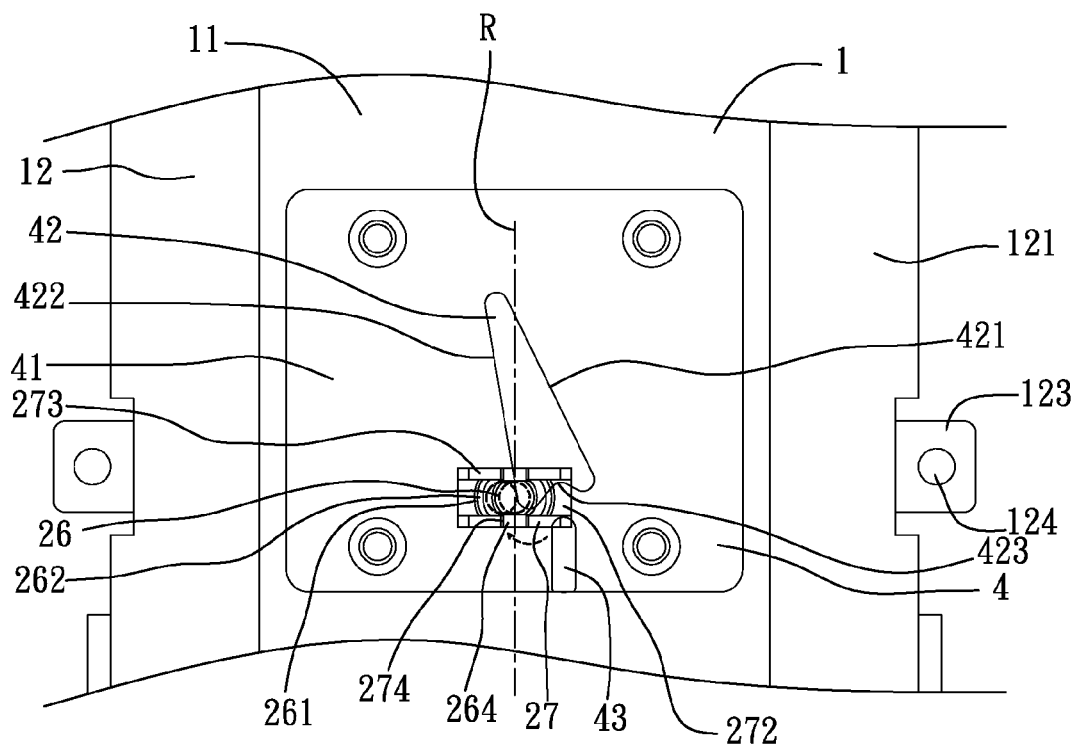
Figure 5F:
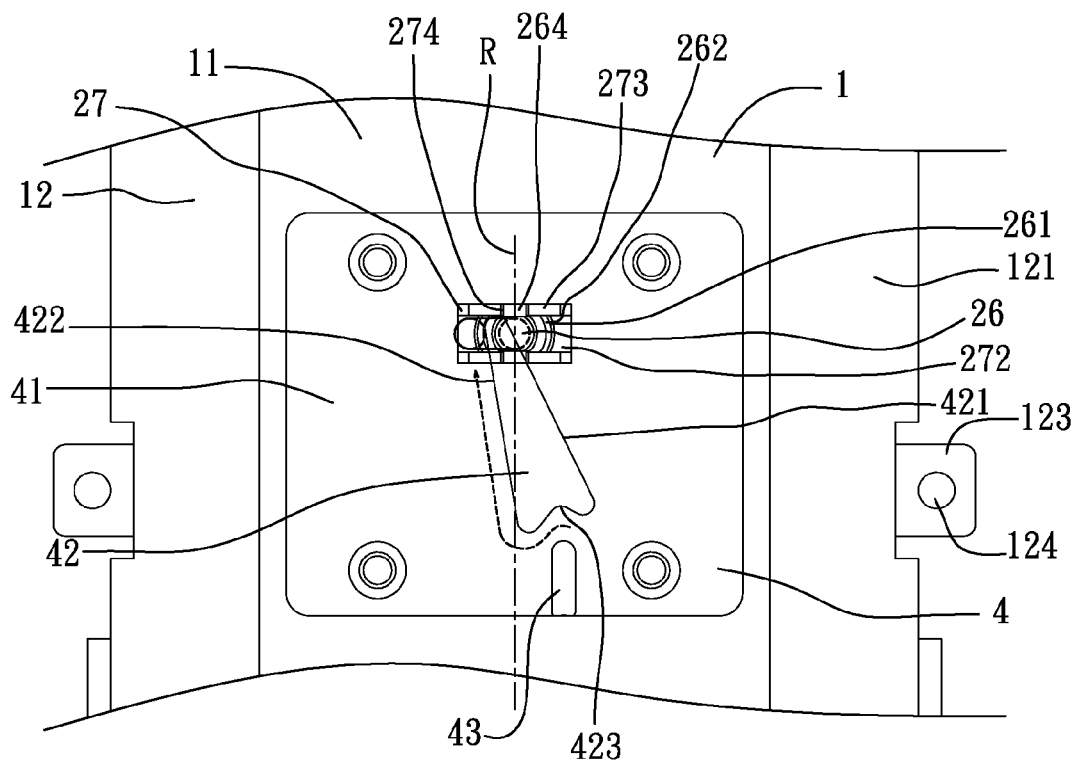
Figure 6:
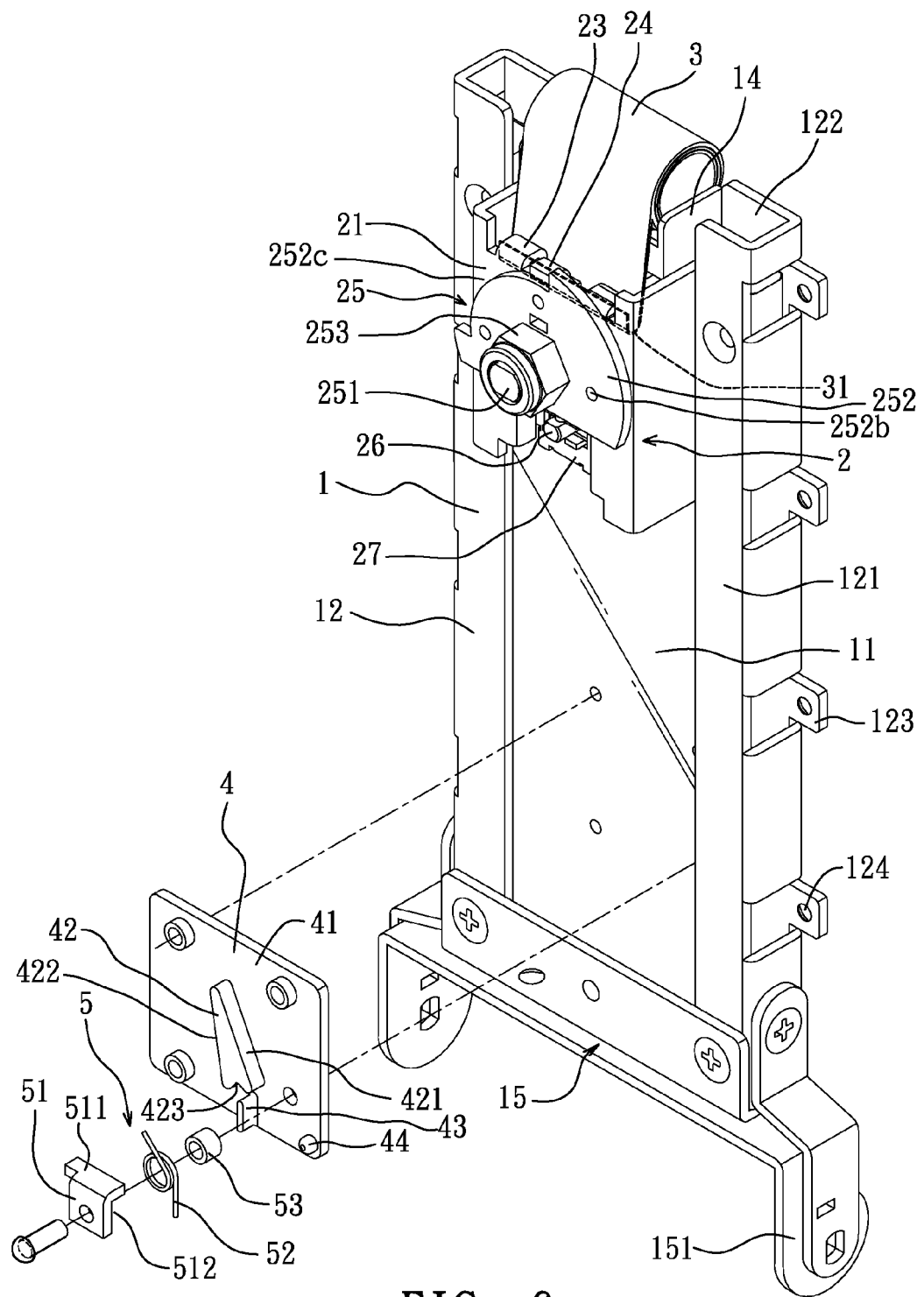
FIG. 6 is an exploded view of the elevating device of another embodiment of the present invention.

For releasing the latching status, another external force is applied for pressing the display device, so the shaft rod 26 is released from the positioning concave slot 423 and is recovered towards the central line R, as shown in FIG. 5e, the shaft rod 26 is in contact with the second guiding plane 422; at this moment, the display device can be upwardly adjusted to the desired height along the second guiding plane 422.

Figure 7:
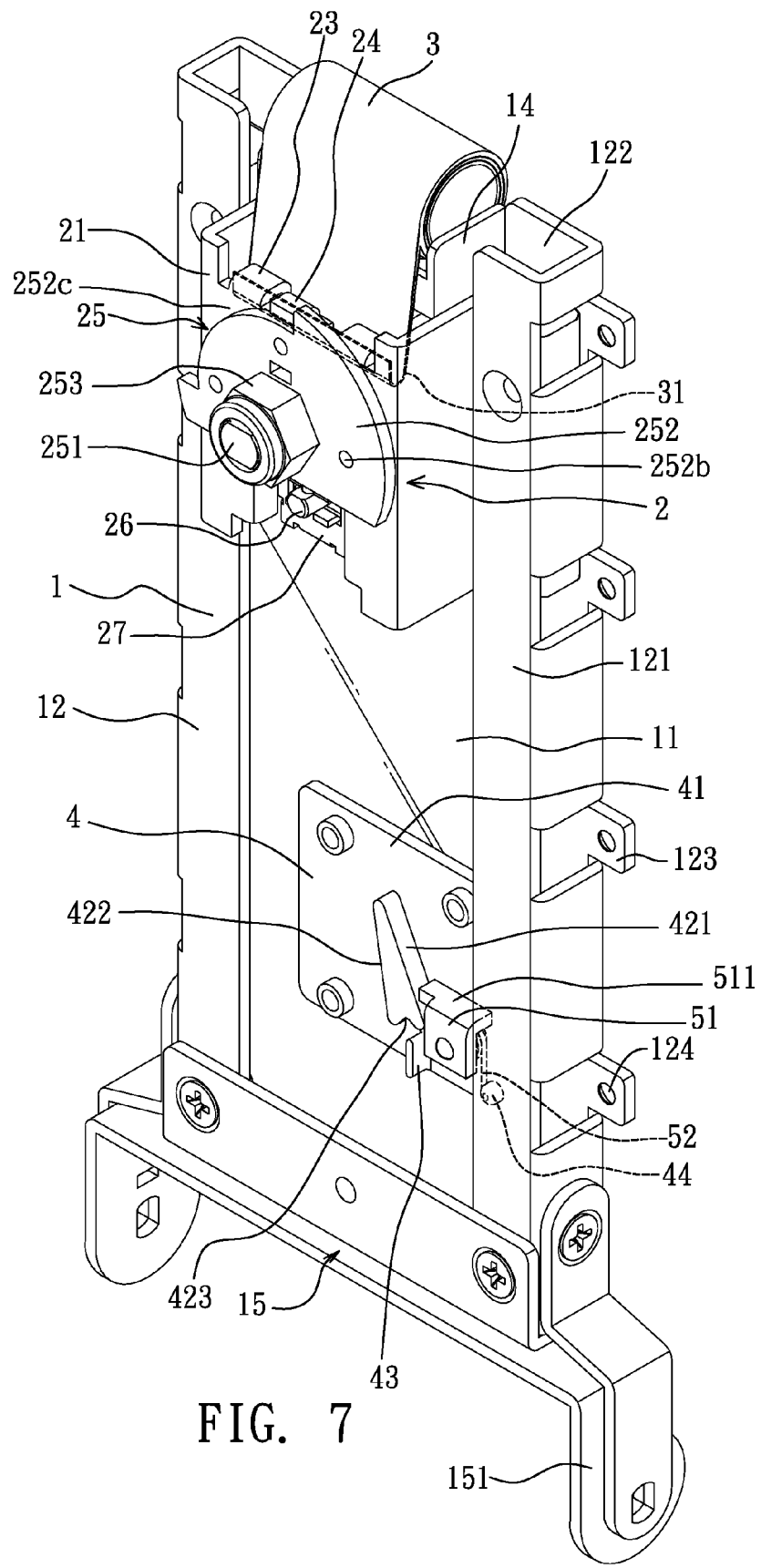
FIG. 7 is a perspective assembly view of the elevating device shown in FIG. 5.

As shown from FIG. 6 to FIG. 8b, which are schematic views of another embodiment of the elevating device with latching function provided by the present invention; wherein the elevating device is the same as the described elevating device comprising the supporting rack 1, the supporting seat 2, the constant force spring 3 and the latching member 4. The difference between this embodiment and the previous embodiment is that a switching mechanism 5 is installed and is disposed at the bottom end of the supporting rack 1 and is preferably disposed on one end of the latching member 4; the switching mechanism 5 has a L-shaped swing sheet 51 and a stopping member 511 is provided at a lateral end of the swing sheet 51, a concave portion 512 is formed at the bottom end of the swing sheet 51 for receiving a torque spring 52 that is sleeved with a sleeve ring 53, one end of the torque spring is provided against the inner end of the stopping member 511 and the other end thereof is provided against the bottom end of the supporting rack 1, e.g. a convex tenon 44 protruded from a corner of the sheet member 41, then a connecting unit, e.g. a shaft pin, is provided and passed through the swing sheet 51 and the torque spring 52 and is pivotally connected on the sheet member 41; because the weight of the stopping member 511 is greater than the elastic force of the torque spring 52, when the supporting rack 1 is placed in a vertical status, the torque spring 52 is not able to move the stopping member 511, so a free end thereof is transversally in contact with a retaining member, e.g. the positioning block 42 or the retaining rail 12. As shown in FIG. 7, when the supporting seat 2 is downwardly moved and the shaft rod 26 or the mobile rail 22 are in contact with the stopping member 511, a stopping effect is therefore provided and served as a downward movement limitation of the supporting seat 2, in other words, with the switching mechanism 5 of the second embodiment of the present invention, the supporting seat 2 and the latching member 4 are prevented from forming a latching status when the supporting rack 1 is placed in a vertical status.

Figure 8B:
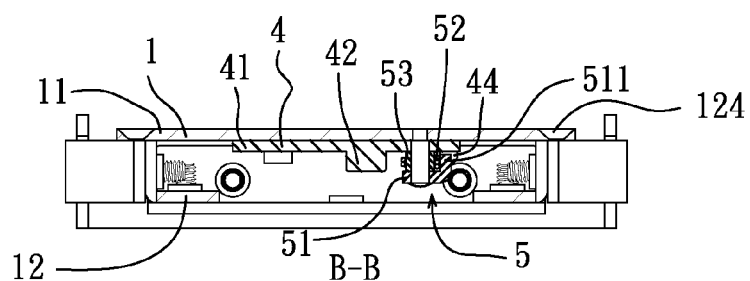
FIG. 8a and FIG. 8b are schematic views of the elevating device of the present invention being adjusted to a horizontal status.
Figure 8A:
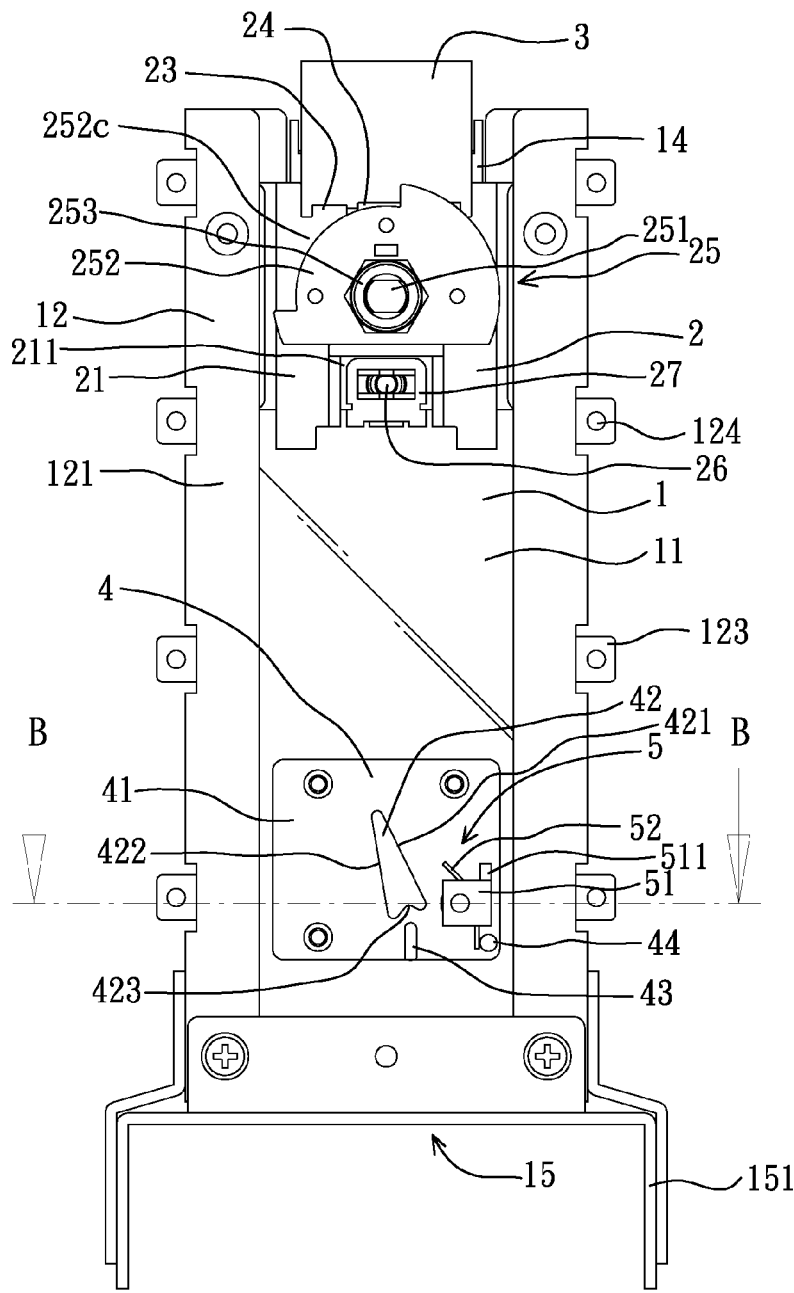

As mentioned above, the supporting rack 1 is able to be connected with the fastening rack of the base seat through the rack boards 151 installed at the two lateral ends of the connecting portion 15, so the supporting rack 1 can be rotated to a horizontal status and the distance between the supporting rack 1 and the base seat is greatly reduced, so the packing volume is therefore reduced, as shown in FIG. 8a and FIG. 8b, the stopping member 511 of the swing sheet 51 is rotated to a horizontal status so the weight of the stopping member 511 is not able to be applied on one end of the torque spring 52, so the torque spring 52 is stretched to push the swing sheet 51 to rotate, so the stopping member 511 is moved from the retaining member, e.g. the positioning block 42 or the retaining rail 12. At this moment, if the display device is desired to be stored between the supporting rack 1 and the base seat, the shaft rod 26 is latched and positioned in the positioning concave slot 423 of the latching member 4 according to the first embodiment, the horizontal length between the display device and the supporting rack 1 is reduced.

The features of the present invention are as follows: with a relative effect of the shaft rod capable of automatically recovering towards the central line installed on the supporting seat of the elevating device and a latching member hidden at the bottom end of the supporting rack, the elevating device is provided with a function of automatic latching and releasing; a switch mechanism is further provided on the elevating device, so when the supporting rack is in a certain status, e.g. rotating from a vertical status to a horizontal status, the weight of the swing sheet of the switching mechanism is not able to be applied on the torque spring, the torque spring is stretched to push the swing sheet to rotate so a latching status is release, and a relative effect of the shaft rod of the supporting seat and the latching member installed at the bottom end of the supporting rack is achieved, so an function of automatic latching and releasing is obtained, and the packing volume is therefore reduced, the components used in the elevating device is simplified and production cost is lowered.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An elevating device with latching function, comprising:
    a supporting rack being provided with a vertical foundation sheet, said vertical foundation sheet having two lateral ends provided with a pair of retaining rails and the top end of the foundation sheet is connected to a spring seat;
    a supporting seat being provided with a seat rack, said seat rack having two lateral ends provided with a pair of mobile rails sleeved in the pair of retaining rails, and a resilient shaft rod capable of automatically recovering towards a central line thereof is protrudingly provided to the seat rack;
    a constant force spring having a coil portion provided on the spring seat and a jointing portion of a free end thereof being connected to the supporting seat; and
    a latching member being installed at the bottom end of the foundation sheet and an arrow-shaped positioning block that is oblique with respect to the shaft rod is installed on the front end of the latching member, two planes defining the acute angle of the positioning block are respectively defined as a first guiding plane and a second guiding plane, and a positioning concave slot is formed at the bottom ends of the two guiding planes;
    when the shaft rod is moved with the supporting seat in the supporting rack, the shaft rod is able to be downwardly moved along the first guiding plane to enter the positioning concave slot for forming a latching status; when the shaft rod is again downwardly moved in the positioning concave slot, the shaft rod is released from the positioning concave slot for forming a releasing status, and the shaft rod is able to be upwardly moved along the second guiding plane;
    wherein a connecting mechanism is further provided, a pivotal shaft is retained on the seat rack and the pivotal shaft passes a shaft hole of a connecting member and is connected with an end sealing member, so the connecting member is able to be rotated with respect to the supporting seat; the connecting member is provided with a plurality of connecting holes.

2. The elevating device with latching function as claimed in claim 1, wherein an auxiliary guiding tenon having an arc-shaped top end is protrudingly provided below the positioning concave slot.

3. The elevating device with latching function as claimed in claim 1, wherein at least one resilient member is provided to the shaft rod and the front end thereof is connected to the seat rack of the supporting seat, so the shaft rod is able to be swung with a fan-shaped means and able to automatically recover towards a central line thereof.

4. The elevating device with latching function as claimed in claim 3, wherein a stopping sheet radially and protrudingly provided on the shaft rod is installed with the resilient member and the shaft rod is passed through a horizontal rod slot preset on a pivotal connecting sheet provided at a concave portion at the bottom end of the seat rack; and a shaft connecting member is fastened in the concave portion of the seat rack and a shaft connecting slot transversally provided to the shaft connecting member is served to let the front portion of the shaft rod to pass through, two parallel pairs of flanges are respectively extended from the top and the bottom ends of the shaft connecting slot and a pin slot is formed in between, and a pin is inserted in a pin hole provided at the front end of the shaft rod and is pivotally connected to the pin slot.

5. The elevating device with latching function as claimed in claim 1, wherein at least a buckling hook is backwardly provided to the top end of the seat rack of the supporting seat, the buckling hook is buckled with the jointing portion of the contact force spring.

6. The elevating device with latching function as claimed in claim 1, wherein a pair of symmetrical rail sheets are correspondingly extended from the pair of retaining rails installed at the two lateral ends of the foundation sheet, a rail portion is respectively formed between the foundation sheet and each of the rail sheets; a pair of seat wings of the mobile rails are extended from the two lateral ends of the seat rack, and an elongated sliding block having a width corresponding to the rail portion is respectively installed on each of the seat wings so the sliding block can longitudinally slide in the rail portion.

7. The elevating device with latching function as claimed in claim 1, wherein the retaining rail and the mobile rail is a rolling-ball retaining sliding rail and a mobile sliding rail.

8. The elevating device with latching function as claimed in claim 1, wherein the spring seat is connected to a top board that is horizontally extended from the top end of the foundation sheet, and the top end of the spring seat has a concave arc shaped surface for receiving the coil portion of the constant force spring.

9. The elevating device with latching function as claimed in claim 1, wherein a stopping portion is provided at the periphery of the connecting member, a stopping tenon is protrudingly installed on the top end of the seat rack, the stopping tenon is received in the stopping portion and served as a rotation angle limitation.

10. An elevating device with latching function, comprising:
a supporting rack being provided with a vertical foundation sheet, said foundation sheet having two lateral ends are provided with a pair of retaining rails and the top end of the foundation sheet is connected to a spring seat;
a supporting seat being provided with a seat rack, said seat rack having two lateral ends are provided with a pair of mobile rails sleeved in the pair of retaining rails, and a resilient shaft rod capable of automatically recovering towards a central line thereof is protrudingly provided to the seat rack;
a constant force spring having a coil portion is provided on the spring seat and a jointing portion of a free end thereof being connected to the supporting seat;
a latching member being installed at the bottom end of the foundation sheet and an arrow-shaped positioning block that is oblique with respect to the shaft rod is installed on the front end of the latching member, two planes defining the acute angle of the positioning block are respectively defined as a first guiding plane and a second guiding plane, and a positioning concave slot is formed at the bottom ends of the two guiding planes; and
a switching mechanism having a swing sheet being protrudingly provided with a stopping member and provided with a torque spring at the bottom end thereof and being pivotally connected to one bottom lateral end of the foundation sheet; so one end of the torque spring is provided against the inner end of the stopping member, the other end thereof is provided against a convex tenon protrudingly installed at the bottom end of the supporting rack, the weight of the stopping member is greater than the elastic force of the torque spring so a free end of the stopping member is transversely in contact with a retaining object;
when the supporting rack is in a vertical status, the supporting seat is downwardly moved so the shaft rod or the mobile rail is in contact with the stopping member for forming a stopping status; when the supporting rack is in a horizontal status, the weight of the stopping member is not able to be applied on the torque spring, so the torque spring is stretched to push the swing sheet to rotate, and the stopping member is moved from the retaining object with which the stopping member is in contact, so the shaft rod is moved with the supporting seat in the supporting rack and is able to be backwardly moved along the first guiding plane to enter the positioning concave slot for forming a latching status; when the shaft rod is against backwardly moved in the positioning concave slot, the shaft rod is released from the positioning concave slot for forming a releasing status, and the shaft rod is able to be forwardly moved along the second guiding plane.

11. The elevating device with latching function as claimed in claim 10, wherein the positioning block is a retaining member, and the switching mechanism is pivotally provided to the latching member, so the stopping member is in contact with the first guiding plane of the positioning block.

12. The elevating device with latching function as claimed in claim 10, wherein an auxiliary guiding tenon having an arc-shaped top end top end is protrudingly provided below the positioning concave slot.

13. The elevating device with latching function as claimed in claim 10, wherein at least one resilient member is provided to the shaft rod and the front end thereof is connected to the seat rack of the supporting seat, so the shaft rod is able to be swung with a fan-shaped means and able to automatically recover towards a central line thereof.

14. The elevating device with latching function as claimed in claim 13, wherein a stopping sheet radially and protrudingly provided on the shaft rod is installed with at least one resilient member and is passed through a horizontal rod slot preset on a pivotal connecting sheet provided at a concave portion at the bottom end of the seat rack; and a shaft connecting member is fastened in the concave portion of the seat rack and a shaft connecting slot transversally provided to the shaft connecting member is served to let the front portion of the shaft rod to pass through, two parallel pairs of flanges are respectively extended from the top and the bottom ends of the shaft connecting slot and a pin slot is formed in between, and an pin is inserted in a pin hole provided at the front end of the shaft rod and is pivotally connected to the pin slot.

15. The elevating device with latching function as claimed in claim 10, wherein at least one buckling hook is backwardly provided to the top end of the seat rack of the supporting seat, the buckling hook is buckled with the jointing portion of the contact force spring.

16. The elevating device with latching function as claimed in claim 10, wherein a pair of symmetrical rail sheets are correspondingly extended from the pair of retaining rails installed at the two lateral ends of the foundation sheet, a rail portion is respectively formed between the foundation sheet and each of the rail sheets; a pair of seat wings of the mobile rails are extended from the two lateral ends of the seat rack, and an elongated sliding block having a width corresponding to the rail portion is respectively installed on each of the seat wings so the sliding block can longitudinally slide in the rail portion.

17. The elevating device with latching function as claimed in claim 10, wherein the retailing rail and the mobile rail is a rolling-ball retaining sliding rail and a mobile sliding rail.

18. The elevating device with latching function as claimed in claim 10, wherein the spring seat is connected to a top board that is horizontally extended from the top end of the foundation sheet, and the top end of the spring seat has a concave arc shaped surface for receiving a coil portion of the constant force spring.

19. The elevating device with latching function as claimed in claim 10, wherein a connecting mechanism is further provided, a pivotal shaft is retained on the seat rack and the pivotal shaft passes a shaft hole of a connecting member and is connected with an end sealing member, so the connecting member is able to be rotated with respect to the supporting seat; the connecting member is provided with a plurality of connecting holes.

20. The elevating device with latching function as claimed in claim 19, wherein a stopping portion is provided at the periphery of the connecting member, a stopping tenon is protrudingly installed on the top end of the seat rack, the stopping tenon is received in the stopping portion and served as a rotation angle limitation.

* * * * *